United States Patent
Allen et al.

(10) Patent No.: US 8,239,611 B2
(45) Date of Patent: Aug. 7, 2012

(54) RELOCATING DATA IN A MEMORY DEVICE

(75) Inventors: Walter Allen, Austin, TX (US); Robert France, Austin, TX (US)

(73) Assignee: Spansion LLC, Sunnyvale, CA (US)

(*) Notice: Subject to any disclaimer, the term of this patent is extended or adjusted under 35 U.S.C. 154(b) by 423 days.

(21) Appl. No.: 11/966,923

(22) Filed: Dec. 28, 2007

(65) Prior Publication Data

US 2009/0172250 A1    Jul. 2, 2009

(51) Int. Cl.
*G06F 12/00* (2006.01)

(52) U.S. Cl. .......................... 711/103; 711/165

(58) Field of Classification Search .................. None
See application file for complete search history.

(56) References Cited

U.S. PATENT DOCUMENTS

| | | | |
|---|---|---|---|
| 5,838,614 A | 11/1998 | Estakhri et al. | |
| 5,864,661 A | 1/1999 | Ohara | |
| 6,128,695 A | 10/2000 | Estakhri et al. | |
| 6,393,513 B2 | 5/2002 | Estakhri et al. | |
| 6,772,274 B1 | 8/2004 | Estakhri | |
| 7,173,852 B2 | 2/2007 | Gorobets et al. | |
| 7,379,331 B2 | 5/2008 | Kasai et al. | |
| 7,434,122 B2 | 10/2008 | Jo | |
| 7,444,460 B2 | 10/2008 | Nakanishi et al. | |
| 7,453,712 B2 | 11/2008 | Kim et al. | |
| 7,457,897 B1 | 11/2008 | Lee et al. | |
| 7,743,203 B2 * | 6/2010 | France | 711/103 |
| 2006/0053252 A1 * | 3/2006 | Ghezzi et al. | 711/115 |
| 2007/0147157 A1 * | 6/2007 | Luo et al. | 365/226 |

FOREIGN PATENT DOCUMENTS

| | | |
|---|---|---|
| JP | 407014398 A | 1/1995 |
| JP | 409186834 A | 7/1997 |
| JP | 2003109396 A | 4/2003 |
| JP | 2006048893 A | 2/2006 |
| WO | 95/10083 | 4/1995 |

OTHER PUBLICATIONS

OA dated Jul. 27, 2009 for U.S. Appl. No. 11/963,286, 10 pages.
OA mailed Feb. 24, 2009 for U.S. Appl. No. 11/963,286, 12 pages.

* cited by examiner

*Primary Examiner* — Kevin Ellis
*Assistant Examiner* — Baboucarr Faal
(74) *Attorney, Agent, or Firm* — Turocy & Watson, LLP

(57) ABSTRACT

Systems and methods that can facilitate more optimized relocation of data associated with a memory are presented. In addition to a memory controller component, a memory manager component can be employed to increase available processing resources to facilitate more optimal execution of higher level functions. Higher level functions can be delegated to the memory manager component to allow execution of these higher level operations with reduced or no load on the memory controller component resources. A uni-bus or multi-bus architecture can be employed to further optimize data relocation operations. A first bus can be utilized for data access operations including read, write, erase, refresh, or combinations thereof, among others, while a second bus can be designated for higher level operations including data compaction, error code correction, wear leveling, or combinations thereof, among others.

11 Claims, 10 Drawing Sheets

RELOCATING DATA IN A MEMORY DEVICE

TECHNICAL FIELD

The subject innovation relates generally to memory systems, devices, methodologies, or combinations thereof, associated with a memory, and more particularly to memory systems, devices, methodologies, or combinations thereof, associated with a memory that can facilitate improved data relocation functions associated with memory.

BACKGROUND

A wide variety of memory devices can be used to maintain and store data and instructions for various computers and similar systems. In particular, flash memory is a type of electronic memory media that can be rewritten and that can retain content without consumption of power. Unlike dynamic random access memory (DRAM) devices and static random access memory (SRAM) devices in which a single byte can be erased, flash memory devices are typically erased in fixed multi-bit blocks or sectors (e.g., erase blocks). Flash memory devices typically are less expensive and more dense as compared to many other memory devices, meaning that flash memory devices can store more data per unit area.

Flash memory is a type of non-volatile electronic memory media that can be rewritten and can retain content without consumption of power. Flash memory has become popular, at least in part, because it combines the advantage of high density and low cost memory with being electrically erasable. Flash memory can be used in many portable electronic products, such as cell phones, portable computers, voice recorders, thumbnail drives and the like. The fact that flash memory can be rewritten, can retain data without a power source, is comparatively small in size, and is relatively light weight have all combined to make flash memory devices useful for transporting and maintaining data.

The amount of data that can be stored in a host device and a mass storage device has steadily increased. For example, multimedia card (MMC) and secure digital (SD) cards can store data ranging from 8 megabytes (MB) to 16 gigabytes (GB) of data or more. As a result of the increased memory capacity of host devices and mass storage devices, there can be a desire to incorporate hardware and/or software tools that can potentially add to the lifetime of these devices.

While flash memory has certain advantages, there is a desire to improve the lifetime of flash memory devices, as flash memory blocks or sectors can be subject to failure or programming errors with continued use (e.g., read, write, program, and erase cycles can wear or age a flash memory). Further, it is desirable to reduce the loss of margin in the cells of an erase block (e.g., fragmented valid data, among others) during erase operations, as reducing margin loss can extend the use of the flash memory as well as reduce programming errors in flash memory.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The subject innovation relates to systems and/or methods for optimizing the useful life, minimizing or reducing loss of margin, and minimizing or reducing programming errors, of non-volatile memory devices (e.g., flash memory). In one aspect of the disclosed subject matter, a system for optimizing the relocation of data (e.g., garbage collection, wear leveling, and data redundancy, among others) that can be performed on memory regions (e.g., write pages, erase blocks, . . . ) in a non-volatile memory device is presented, wherein a local memory manager component can manage data relocation within memory regions to facilitate optimizing data relocation based in part on a predetermined relocation criteria (e.g., a selectable trigger). The predetermined relocation criteria can include, for example, an erase block reaching a predetermined population of invalid data, reaching a predetermined level of wear, reaching a predetermined level of capacity, or combinations thereof, among other criteria that can indicate more optimal performance based in part on relocating data. For example, a memory manager component can relocate data triggered by, for example, an ECC error flag (e.g., damaged memory cell location), cycle counts (e.g., wear leveling), or for data compaction (e.g., garbage collection), or combinations thereof, among others such triggers.

In another aspect, the local memory manager component can facilitate relocation of data independent of the host system by coordinating with typical memory device operations executed in a more traditional memory controller component. For example, a memory manager component can relocate data in erase blocks that are not being accessed by memory operations (e.g., reads, writes, erases, . . . ) being performed by the memory controller component related to host process data access.

The memory manager component can be independent of the memory controller component or can be part of a memory controller component to facilitate more optimized data relocation functions, among other memory operation functions or data relocation functions. For example, the memory manager component can be a separate processor built on a separate silicon substrate located within a memory component. Further, for example, the memory manager component can be a separate processor built on a substrate hosting other processors or components. Additionally, for example, a memory controller component can comprise memory controller component functionality and memory manager component functionality (e.g., additional memory controller component circuitry at least in part added to facilitate memory manager component functionality, a memory manager component thread on a multithreading memory controller component processor, . . . ).

The following description and the annexed drawings set forth in detail certain illustrative aspects of the disclosed subject matter. These aspects are indicative, however, of but a few of the various ways in which the principles of the innovation can be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
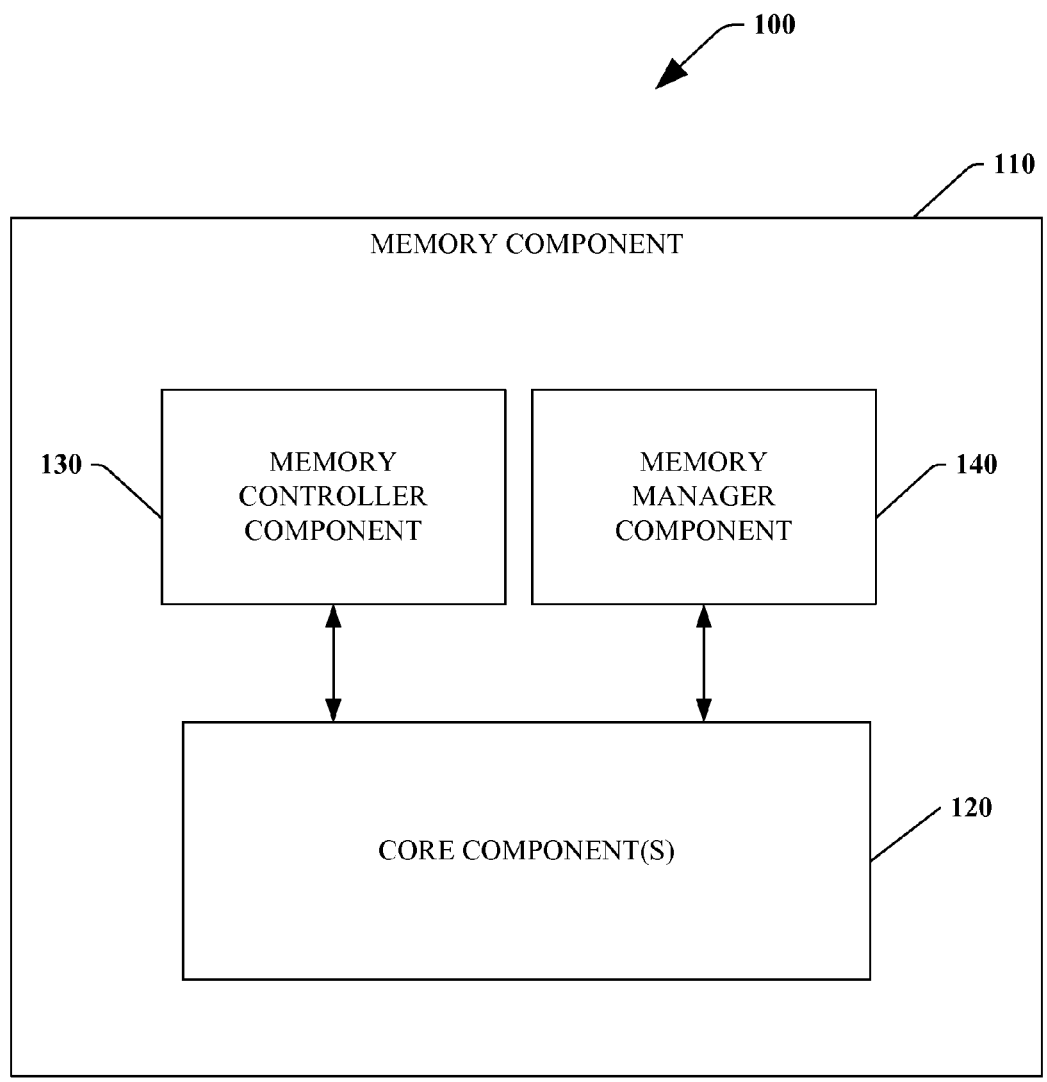
FIG. 1 is a high level diagram of a system that can facilitate optimized relocation of data associated with a memory in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter can be practiced without these specific details. In other instances, well-known structures and devices are illustrated in block diagram form in order to facilitate describing the subject innovation.

Conventionally, mass storage devices (e.g., flash memory) can have a memory controller component, wherein the memory controller component can manage the interface between a memory (e.g., a core memory component, buffer memory component, . . . ) and a host processor or other component. Essentially, a memory controller component can facilitate file management functions for mass storage devices. The memory controller component can be located on a memory component or can be located external to the memory component and/or memory device. Often, memory controller components utilize uni-bus architectures, or can use multi-bus architectures, for file management. Where modern mass storage devices have become very large (e.g., a 16 GB thumb drive), management of files for host process data access operations (e.g., read, write, erase, refresh, . . . ) can consume much of the available memory controller component processing resources. Further, higher level functionality, including, for example, data relocation functions (e.g., data compaction, error code correction, wear leveling, . . . ), can also be processor resource intensive. Improving the optimization of data relocation functions and other high level functionality can improve overall device performance.

Systems, devices, and/or methods that can facilitate relocating data associated with a memory are presented. A memory manager component can be included in a memory device that can be a processor and can be employed to, at least in part, share in the processing of higher level memory functions, including data relocation functions (e.g., data compaction, error code correction, wear leveling, . . . ). In one embodiment, the memory manager component can be dedicated to processing higher level memory functions, relieving the memory controller component of the responsibility for performing such functions. In another embodiment, the memory manager component can be dedicated to processing select higher level memory functions including data relocation functions, at least in part relieving the memory controller component of the responsibility for performing these select higher level memory functions. The memory manager component with its processing resources can facilitate locally managing data relocation tasks (e.g., data compaction, error code compensation, wear leveling, . . . ) and/or other tasks that can be highly processor intensive. In yet another embodiment, the memory manager component can be dedicated to processing portions of memory functions (e.g., a memory manager component can process data validity operations in support of a memory controller component executing a data compaction higher level memory operation, . . . ) where the memory controller component can have a predetermined level of resources dedicated in other memory function operations. One of skill in the art will appreciate that numerous other embodiments are readily apparent in which memory controller component processing resources can be pooled with memory manager component resources, wherein the memory manager component can be located local to the memory device, and this pool of processing resources can be allocated to optimize memory performance and more specifically to improve data relocation operations and other data access operations. All such embodiments are considered within the scope of the disclosed subject matter.

It is to be appreciated that both a memory controller component and a memory manager component can be configured to operate after start up by using respective processor components that can execute firmware or similar types of code from a non-volatile memory (e.g., read only memory (ROM), flash memory, . . . ). These respective processor components can subsequently access a nonvolatile memory or a random access memory (RAM) to obtain further firmware instructions for executing commands. For example, the memory manager component can perform such tasks as memory wear leveling (e.g., active or static wear leveling) and/or data compaction (e.g., garbage collection) to reclaim memory cells within a memory. The disclosed subject matter also contemplates that these types of tasks associated or performed by the memory manager component can be performed while data can be simultaneously or substantially simultaneously transferred between the mass storage components and the host components under separate instructions being executed on the memory controller component. For example, the memory manager component can perform tasks on a first bus while data can be transferred by a memory controller component on a second bus, wherein the first bus and the second bus can operate independent of each other.

Turning to the figures, FIG. 1 illustrates a system 100 that can facilitate optimized relocation of data associated with a memory in accordance with an aspect of the disclosed subject matter. System 100 can include one or more memory components 110 that can facilitate storage and/or access of data. The memory component 110 can comprise core component(s) 120 having addressable volatile and/or non-volatile memory (e.g., flash memory) that can facilitate storage and/or access to data. Memory in a core component(s) 120 can be arranged as a memory cell array(s) that can contain a plurality of memory cells, wherein each memory cell can store one or more bits of data (e.g., the same as or similar to that illustrated in FIG. 4 and described herein).

The core component(s) 120 can be comprised of nonvolatile memory and/or volatile memory, for example. Nonvolatile memory can include, but is not limited to, flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, electrically erasable PROM (EEPROM), and/or non-volatile random access memory NVRAM (e.g., ferroelectric RAM (FeRAM)). A flash memory can be comprised of NAND memory and/or NOR memory, for example. Volatile memory can include, but is not limited to, random access memory (RAM), static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

The memory component 110 can further include a memory controller component 130 that can facilitate memory access by executing memory operation instructions (e.g., read, write, erase, refresh, . . . ). The memory controller component 130 can be physically located in a memory component 110, can be a stand-alone component, or can be in another component, or respective portions of the memory controller component 130 can be contained in any suitable combination of such components, as desired. The memory controller component 130 can be communicatively coupled to the core component(s) 120. This communicative coupling can include the use of a uni-bus and/or multi-bus architecture. For example, the multi-bus architecture can facilitate the isolation of memory operations, such as reads, writes, and erases, among others, from data relocation functions, such as, data compaction, error code correction, and wear leveling, among others (e.g., functions that can be delegated to a memory manager component 140 as described herein).

In accordance with one aspect of the disclosed subject matter, the memory component 110 can further include a memory manager component 140 that can facilitate optimized data relocation, among others functions it can perform. The memory management component 140 can be communicatively coupled to the core component(s) 120. This communicative coupling can include the use of a uni-bus or multi-bus architecture. In one aspect, the memory management component 140 can execute code associated with higher level memory operations. For example, basic memory operations (e.g., read, write, erase, refresh, . . . ) can be delegated to the memory controller component 130 while more advanced functionality (e.g., data compaction, error code correction, wear leveling, . . . ) can be assigned to the memory manager component 140. This can result in reducing the operational load on the memory controller component 130 resources allowing it to operate in an optimized manner. Thus, overall memory performance can be improved as compared to conventional memory systems and/or devices.

Further, by moving higher level functions to a memory manager component 140, advanced functionality can operate independent of the load placed on the memory controller component 130 and can further facilitate performing operations in parallel. Operations over a uni-bus architecture can be facilitated by communicatively coupling the memory controller component 130 with the memory manager component 140 to coordinate bus access between the two. For example, the memory controller component 130 can execute a read operation (e.g., a large read operation) while simultaneously or substantially simultaneously the memory manager component 140 can process to make a determination (e.g., which can be resource intensive) of data validity as part of a data compaction operation without reducing the resources of the memory controller component 130. Higher level functionality can include, for instance, data compactions (e.g., garbage collection), wear leveling (e.g., active, static, . . . ), or error code correction (e.g., relocating data from damaged or suspect memory locations).

In accordance with one aspect of the disclosed subject matter, the memory controller component 130 can utilize, in part, a first bus in a multi-bus architecture for data access operations while the memory manager component 140 can utilize, in part, a second bus in a multi-bus architecture to facilitate more optimized data relocation. The memory controller component 130 can, for example, receive instructions to transfer data from host components (not illustrated) to the core component(s) 120 by way of the first bus. The memory manager component 140 can, for example, locally analyze data for validity related to a data compaction operation by way of the second bus. Further, additional bus lines can also be employed for additional functionality without departing from the scope of the herein disclosed subject innovation. For example, by utilizing a multi-bus architecture having, for example, three bus lines, the subject innovation can increase the overall throughput of the data by running data on a first bus, executing memory controller component 130 instructions on a second bus, and executing memory manager component 140 functionality over a third bus.

It is to be appreciated that bus architectures can be, for example, comprised of any of several types of well known bus architectures. These types of bus architectures can include, but are not limited to, Advanced Microcontroller Bus Architecture (AMBA), AXI Bus, and VME bus. It is to also be appreciated that they can be, for example, associated with such bus architectures as the Extended ISA (EISA), Industrial Standard Architecture (ISA), Micro-Channel Architecture (MSA), VESA Local Bus (VLB), Card Bus, Universal Serial Bus (USB), Advanced Graphics Port (AGP), Personal Computer Memory Card International Association bus (PCM-CIA), Firewire (IEEE 1394), Small Computer Systems Interface (SCSI), Intelligent Drive Electronics (IDE), and Peripheral Component Interconnect (PCI).

Figure 2:
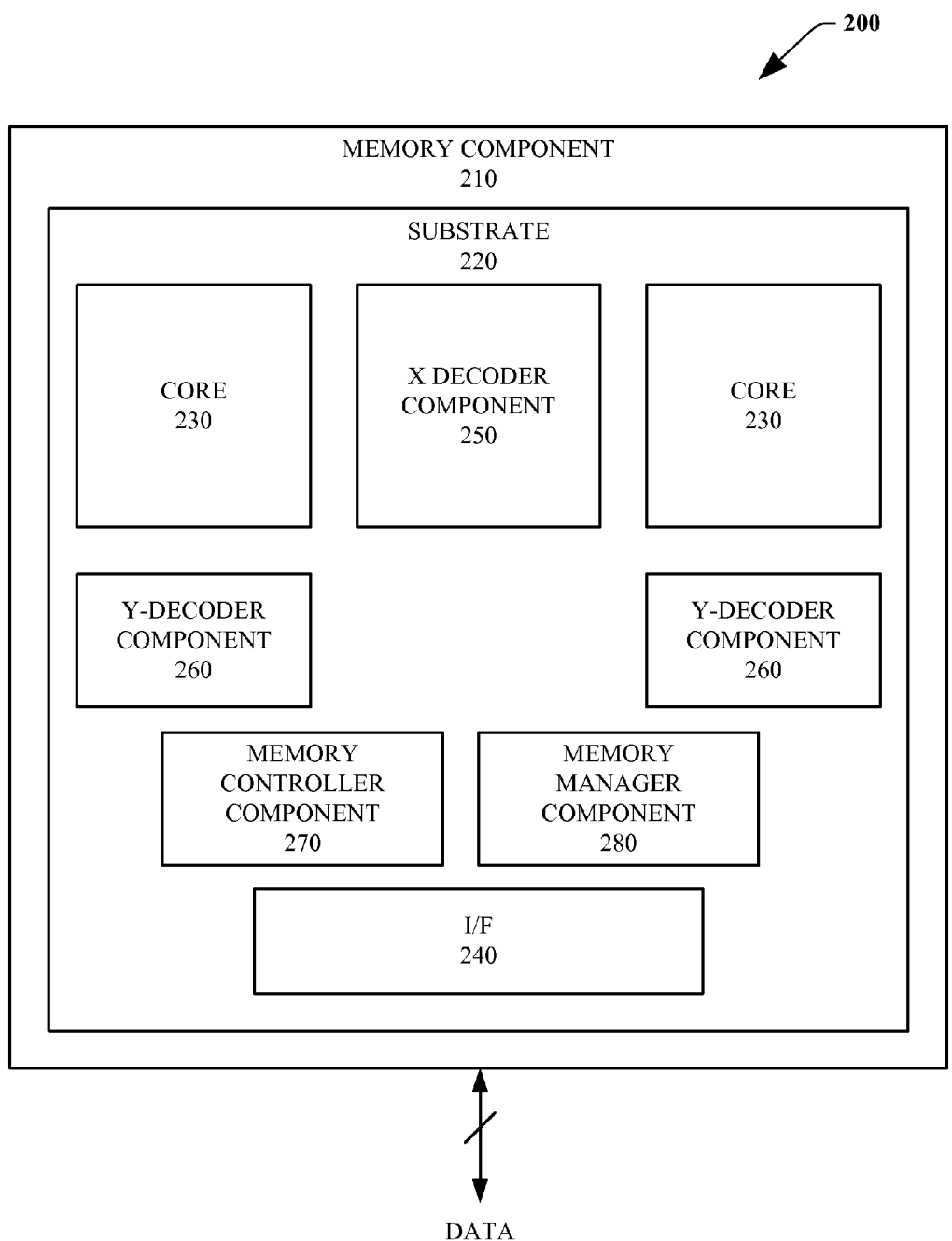
FIG. 2 is a diagram of a system that can facilitate optimized data relocation of data associated with a memory in accordance with an aspect of the subject matter disclosed herein.

Referring to FIG. 2, depicted is a diagram of a system 200 that can facilitate optimized data relocation of data associated with a memory in accordance with an aspect of the disclosed subject matter. System 200 can include a memory component 210 that can include a single substrate 220. The substrate 220 can include one or more cores 230 (e.g., arrays of memory cells and related components) for accessing data associated with the memory. Data can be accessed (e.g., read, written, erased, refreshed, . . . ) on the core through an I/F component 240.

The substrate 220 can further include one or more X-decoder components 250 and one or more Y-decoder components 260 to facilitate accessing data associated with the memory. The X-decoder 250 and Y-decoders 260 can translate address information associated with accessing the cores 230 (e.g., memory cell physical block locations generally identified with physical block addresses (PBAs)). For example, a read, write, erase, or refresh operation can include the PBA of data to access (e.g., read, write, erase, refresh, . . . ) such that the X-decoder 250 and Y-decoder 260 can translate the PBA to facilitate accessing the correct memory location in the core 230. Similarly, for example, a PBA can be related to a data location for data compaction, error code correction, or wear leveling, among other data relocation functions or data access functions, such that the PBA can be translated by the X-decoder 250 and Y-decoder 260 to facilitate performing such higher level operations on the addressed memory location.

According to an aspect of the subject innovation, the substrate 220 can also include a memory controller component 270 (e.g., similar to memory controller component 130) to facilitate accessing data related to a memory. The memory controller component 270 can process commands passed in through the I/F component 240, for example, executing portions of a read, write, erase, or refresh command, among other data access functions. For example, a read command can be passed into system 200, to the memory controller component 270 through the I/F component 240, containing executable code for the read operation and a PBA or logical block address (LBA). The memory controller component 270 can, for example, facilitate translating the LBA into a PBA, in accordance with the read operation executable code or locally stored read operation executable code. The PBA (e.g., the translated LBA or a PBA passed directly in) can be passed to the X-decoder component 250 and Y-decoder component 260 to address the desired memory location in the core component 230. The memory controller component 270 can read out the data from the addressed memory location in the core component 230 through the I/F component 240. Similarly, write, refresh, or other memory operations can be executed through the memory controller component 270, as will be appreciated by one of skill in the art.

The particular subset of operations assigned for execution through the memory controller component 270, as will be appreciated by one of skill in the art, can be dependent on the particular implementation of system 200. Where low level functionality is implemented through the memory controller component 270 and higher level functionality is implemented by another component (e.g., a memory manager component 280 as discussed herein) this low level functionality can include read, write, erase, refresh, or combinations thereof, among many other data access functions. Further, the types of operations for execution on the memory controller component 270 are not strictly limited to low level operations and additional higher level operations can be processed on the memory controller component 270, where so desired. For example, where a data compaction is executed by the memory controller component 270, a memory manager component 280 (e.g., as discussed herein) can, separate from the memory controller component 270, process the validity of data for the compaction operation. As another example, a memory manager component 280 (e.g., as herein discussed) can process data compaction operations and all other memory functionality can be processed through the memory controller component 270. The division of operations is generally only dependant on the desired allocation of processing resources resulting from the summed processing power of both the memory controller component 270 and other available local processing components (e.g., a memory manager component 280, some other co-processor, or combinations thereof, among many others).

The system 200 can further include a memory manager component 280 (e.g., similar to memory manager component 140) to facilitate data relocation operations (e.g., data compaction, error code correction, wear leveling, . . . ) in accordance with the disclosed subject matter. The memory manager component 280 can provide additional local processing resources for management of data related to the memory component 210. As stated herein, the particular division of operations between the memory manager component 280 and another component, such as, for example, a memory controller component 270 or some other processor, can be dependent on the desired division of processing resources and any division of at least some processing between one or more local processors is considered within the scope of the subject innovation. For example, a memory controller component 270 can be employed for processing read, write, erase, and refresh operations and a memory manager component 280 can be assigned other operations, for example, data compaction, wear leveling, and/or error code correction, among many others.

In accordance with one particular embodiment, the memory manager component 280 can process data compaction functions to facilitate optimized relocation of data associated with the memory. For example, a data compaction (e.g., garbage collection) can be indicated and performed when a first erase block has reached a predetermined threshold level of fullness (e.g., a predetermined threshold percentage or amount of the first erase block contains data as compared to the storage capacity of the first erase block). The memory manager 280 can, for example, analyze the data in the erase block for validity and transfer valid data to a second erase block in a more compacted form. The memory manager component 280 can, for example, erase the first erase block to free it for future memory operations. By employing the memory manager component 280 as a second processor in the system 200, this data compaction operation can be executed with less dependence on the state or use of the memory controller component 270, freeing the memory controller component 270 for other operations, for example, user requested data reads and others. Similarly, other functionality can be executed by the memory manager component 280, locally and independent from the memory controller component 270 and can include, for example, error code correction (e.g., moving data when an error is determined at the existing memory location where the data was accessed), static wear leveling, or active wear leveling, among many others.

Where a uni-bus architecture is employed, the memory controller component 270 and memory manager component 280 can be communicatively coupled to coordinate use of the single bus. Where a multi-bus architecture is employed, the memory manager component 280 can operate on a separate bus and/or share one or more busses with other system 200 components. Additional processor components can also be included to further facilitate a larger processing resource pool from which select operations can be assigned to one or more other processing components, including distributed processing of operations. For example, low level functionality can be processed in a memory controller component 270, data compaction can be processed in a first memory manager component 280, and error code correction and/or wear leveling can be processed between a second and/or third memory manager component (not illustrated) in a distributed manner. A plurality of other examples will be obvious to one of ordinary skill in the art and all such embodiments are to be considered with the scope of the subject innovation.

Figure 3:
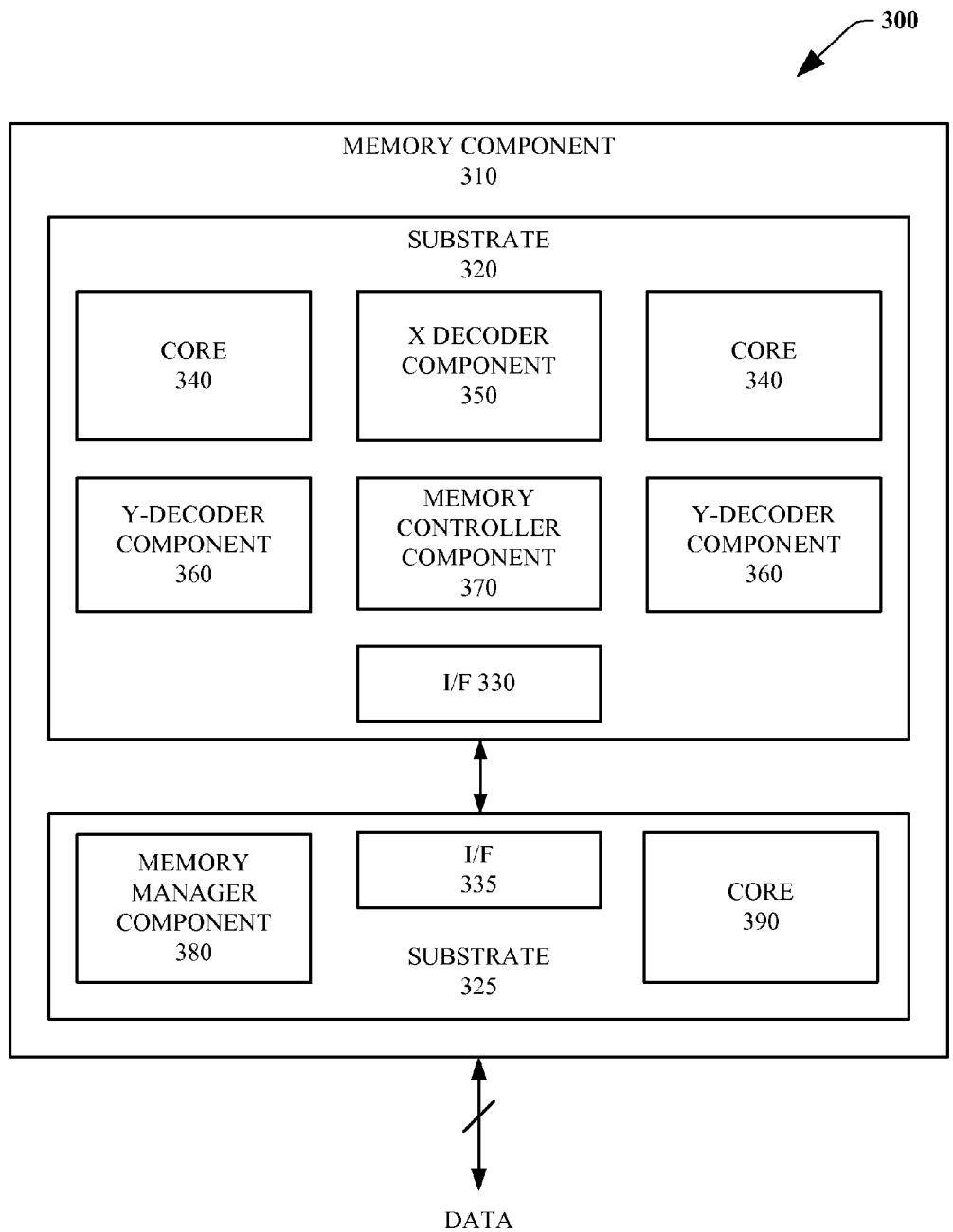
FIG. 3 is a diagram of a system that can facilitate optimized data relocation of data associated with a memory in accordance with an aspect of the subject matter disclosed herein.

Turning to FIG. 3, illustrated is a system 300 that can facilitate optimized data relocation of data associated with a memory in accordance with an embodiment of the disclosed subject matter. System 300 can include a memory component 310 that can comprise a first substrate 320 and at least one other substrate 325. For example, the memory component 310 can include a first die and a second die, the first die including typical mass storage device circuitry and the second die including circuitry for additional mass storage operation processing. The first substrate 320 can include an I/F component 330 and the second substrate 325 can include a second I/F component 335 for passing code and data on and off each substrate.

In accordance with an aspect, substrate 320 can include one or more cores 340 (e.g., memory cell physical block locations generally identified with PBAs) that can be the same as or similar to core 230, as illustrated in FIG. 2 and described herein. This core(s) 340 can store data associated with the memory component 310. Data can be accessed by decoding a memory cell location from a PBA by an X-decoder 350 (e.g., same as or similar to X-decoder 250) and a Y-decoder 360 (e.g., same as or similar to Y-decoder 260).

Substrate 320 can further include a memory controller component 370 (e.g., same as or similar to memory controller component 270) that can facilitate accessing data (e.g., read, write, refresh, erase, . . . ) associated with memory component 310. For example, a read operation can be passed to the memory controller component 370 such that data can be read from a memory location in core 340. Similarly, for example, data can be written to a memory location in core 340 by memory controller component 370.

In accordance with a particular embodiment, memory component 310 can include at least one additional substrate, for example, substrate 325 that can include a memory manager component 380 to facilitate optimized data relocation operations, among other functions it can perform. It is to be appreciated that the memory manager component 380 can be the same as or similar to, and/or can comprise the same or similar functionality as, the memory manager component 280, as illustrated in FIG. 2 and described herein, and/or the memory manager component 140, as illustrated in FIG. 1 and described herein. Memory manager component 380 can be communicatively coupled to core 390 to facilitate processing higher level operations with local memory component 310. For example, where memory manager component 380 executes an error code correction operation, data that is stored in a location determined to be at risk of data corruption can be transferred to a second memory location by looking up a list of available memory locations stored on core 390. In a second example, where a wear leveling operation can be executed, data being moved to less worn memory locations can be cached on core 390 as part of the operation. In a third example, core 390 can be employed to store information related to determinations of data validity during a data compaction operation being executed by memory manager component 380. One of skill in the art will appreciate that a nearly limitless number of uses for core 390 are possible and that all such uses are considered within the scope of the disclosed subject matter.

Employing additional substrates can, for example, allow existing memory component designs (e.g., memory components that have only a single processor, such as a memory controller component, among others) to be incorporated into more advanced memory component designs (e.g., multiple processor memory devices) by adding one or more additional substrates rather than redesigning a single substrate to comprise a plurality of processors. For example, an existing single processor memory component line can be upgraded to allow incorporation of a second die into the memory component, resulting in production of a multi-processor memory component (e.g., similar to system 300).

The memory controller components 130, 270, and/or 370 and the memory manager components 140, 280, and/or 380 can be, for example, one or more of virtually any type of processor. The memory controller components 130, 270, 370 and/or memory manager components 140, 280, 380 each can be a processor that can execute the firmware associated with the respective memory component 110, 210, 310. The firmware can be preloaded into a ROM (not illustrated), for example. In accordance with one aspect of the disclosed subject matter, the ROM can be a boot ROM, wherein the memory controller component(s) 130, 270, 370 and/or memory manager component(s) 140, 280, 380 can fetch (e.g., by way of a bus (not illustrated) as described herein) and execute the code contained within the ROM when the respective memory controller component(s) 130, 270, 370 and/or memory manager component(s) 140, 280, 380 boots.

In one embodiment, systems 100, 200, and 300 can include a storage component (not illustrated), which can comprise volatile and/or non-volatile memory (not illustrated). The storage component can, for example, be used to store data for the related memory controller component(s) 130, 270, 370 and/or memory manager component(s) 140, 280, 380, during code execution, for example. In one aspect, the storage component can store boot-up sequence information for the memory controller component(s) 130, 270, 370 and/or memory manager component(s) 140, 280, 380, for example. The memory controller component(s) 130, 270, 370 and/or memory manager component(s) 140, 280, 380, can fetch and execute code from the storage component, for example. It is to be appreciated that instructions stored in the storage component can, for example, be loaded into memory prior to boot-up or after boot-up by way of a peripheral subsystem (not illustrated).

Figure 4:
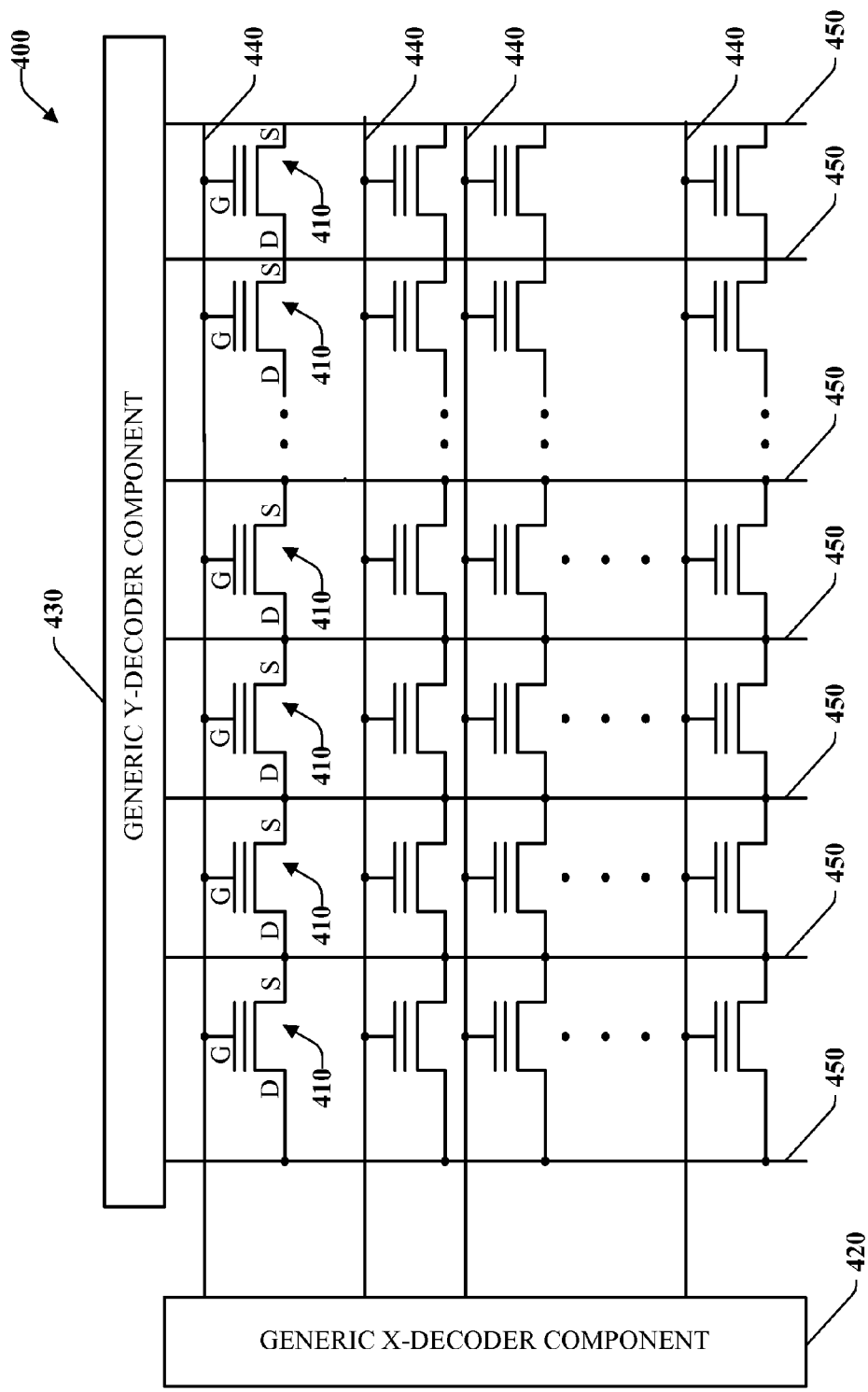
FIG. 4 is a generic schematic diagram of a generic array of memory cells associated with a generic memory in accordance with an aspect of the subject matter disclosed herein.

Referring to FIG. 4 illustrated is a generic schematic diagram of a generic array 400 of memory cells associated with a generic memory in accordance with an aspect of the subject matter disclosed herein. The generic memory array 400 can include an array of generic memory cells 410 that can comprise a plurality of transistors. While only a single transistor is illustrated as representative of a generic memory cell 410, the generic memory cell can comprise a plurality of transistors for each cell. Transistors in a generic memory cell 410 can each be comprised of a drain (D), gate (G), and source (S) and be interconnected as is well known in the art to produce an appropriate type of memory cell for the application selected. In accordance with an aspect, one or more bits of data can be stored in each generic memory cell 410. In accordance with another aspect, each generic memory cell 410 can be a multi-level cell, where data can be represented by a level of charge stored within the memory cell 410.

The generic memory array 400 can include a generic X-decoder component 420 (e.g., word line decoder) and a generic Y-decoder component 430 (e.g., bitline decoder) that can each respectively decode inputs/outputs during various memory operations (e.g., writing, reading, refreshing, erasing, . . . ) that can be performed on the generic memory cells 410, to facilitate storage and/or access of data. The generic X-decoder component 420 and generic Y-decoder component 430 can each receive address bus information, for example, from a memory manager component (e.g., 140) and/or memory controller component (e.g., 130), or the like, and can utilize such information to facilitate accessing or selecting generic memory cell(s) 410 (e.g., memory location(s)) associated with a memory operation or data relocation operation, among others. The generic memory array 400 can be adapted to facilitate a broad plurality of memory applications. For example, where generic memory array 400 is adapted to a core component 230, generic X-decoder 420 can be or can contain the same or similar functionality as a core X-decoder component 250 (e.g., as depicted in FIG. 2 and described herein), generic Y-decoder 430 can be or can contain the same or similar functionality as a core Y-decoder component 260 (e.g., as depicted in FIG. 2 and described herein), and generic memory cells 410 can be or can contain the same or similar functionality as core memory cells. In another example, where generic memory array 400 is adapted to a core component 120 (e.g., as depicted in FIG. 1 and described herein), the generic X-decoder 420 can be adapted to be a core X-decoder (not illustrated), the generic Y-decoder 430 can be adapted to be a core Y-decoder (not illustrated), and the generic memory cells 410 can be adapted to be core memory cells (not illustrated). In accordance with one aspect, the generic X-decoder 420 and generic Y-decoder 430 each can be tree-type decoders.

The generic memory cells 410 can be formed in rows and columns. A common wordline 440 can be, for example, commonly coupled to the control gate (G) of each memory cell 410 in a row to control when the generic memory cells 410 in that row can be conductively coupled to the bitline columns as is well known in the art. Further, for example, a common bitline 450 can be commonly coupled to each generic memory cell 410 in a column and can be selectively conductively coupled to the generic memory cell 410 by the common wordline 440 as is well known in the art. Further, each common bitline 450 can also comprise a plurality of data access lines (e.g., bitline, bitlinebar, . . . ). In accordance with an aspect of the disclosed subject matter, respective charge potentials can be applied to one or more memory cells 410 through the common wordlines 440 and common bitlines 450 to facilitate performing memory operations, such as write, read, refresh, erase, and the like.

It is to be appreciated that while the generic memory cells 410 are illustrated as being respectively associated with a drain and a source, in accordance with one embodiment, where a generic memory cell 410 contains charge storage components on two sides of the generic memory cell 410 that can each be programmed with data (e.g., charge stored therein), the drain can act as the source, and/or the source can act as the drain, depending on which charge storage component of the generic memory cell 410 is being charged during a given memory operation.

Figure 5:
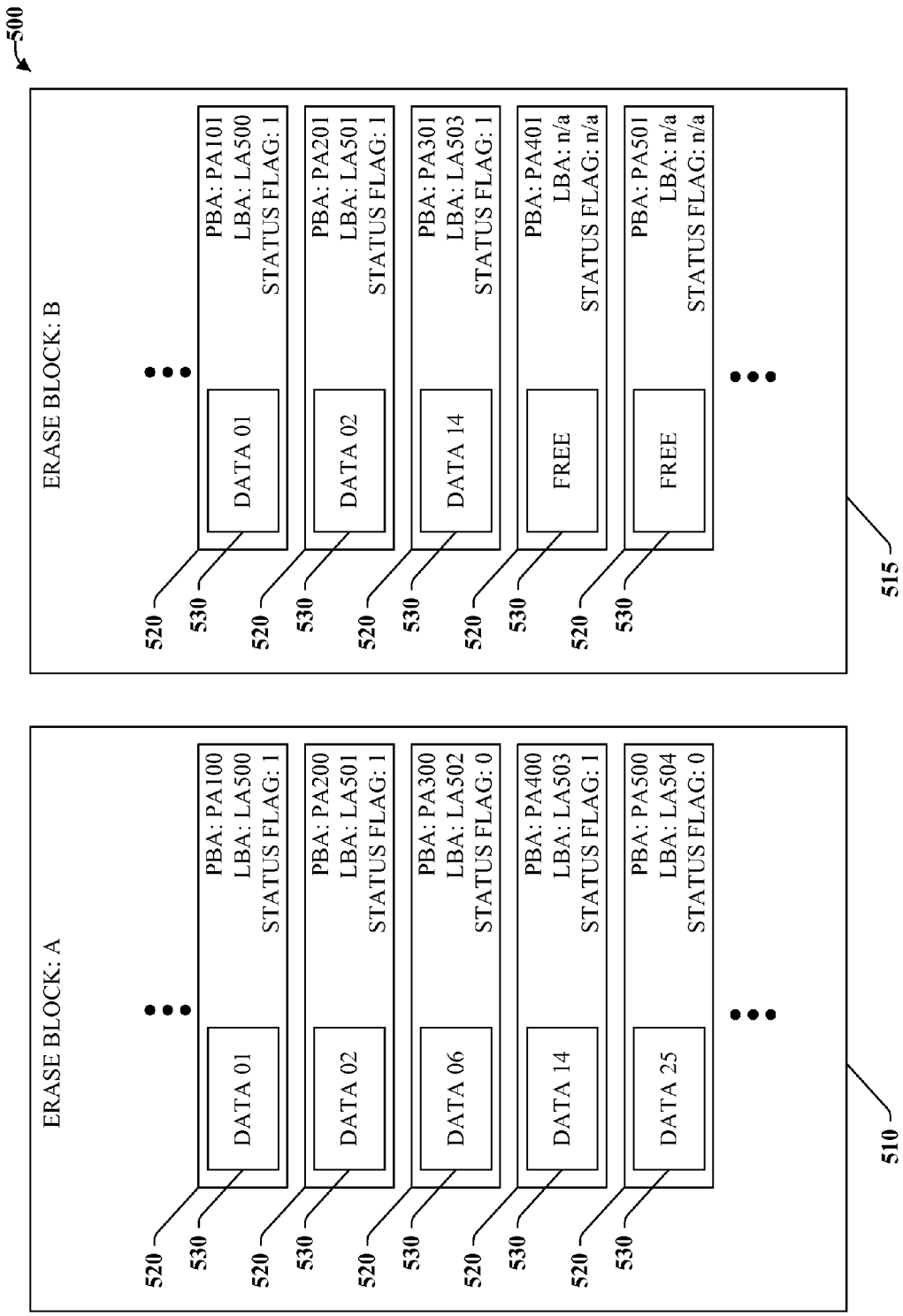
FIG. 5 illustrates a block diagram of generic data compaction in a system that can facilitate relocation of data associated with a memory in accordance with an aspect of the disclosed subject matter.

Turning to FIG. 5, depicted is a block diagram of generic data compaction in a system 500 that can facilitate relocation of data associated with a memory in accordance with an aspect of the disclosed subject matter. Data compaction (e.g., garbage collection) can facilitate more efficient use of memory space in a memory (e.g., flash memory) by freeing areas of memory for erasing and reuse. Where a memory erases multi-page erase blocks, maintaining unused or invalid data on those pages can be inefficient. Further where the erase block can be erased as a whole, preserving valid data or data still being used can be desirable before erasing the erase block.

System 500 contains two erase blocks, respectively labeled as erase block A 510 and erase block B 515. Each erase block 510 and/or 515 can include a plurality of pages 520, for example, a plurality of 512-byte pages. Each page can contain data 530, and support information, such as, for example, PBA, LBA, and/or status information. Additionally, wear level information can be stored in a page 520 in an erase block (e.g., erase block A 510 and/or erase block B 515), for example, erase block A 510 can have a wear level of 140 cycles (e.g., erase cycles) and erase block B 515 can have a wear level of 3 cycles. Generally, wear levels can be related to the number of cycles of reads, writes, erases, refreshes, or other events (e.g., ECC events, monitored alpha particle events, . . . ). It is generally desirable to balance wear levels to prolong the useable life of a memory (e.g., flash memory).

As illustrated in FIG. 5, erase block A 510 can contain data that have associated status flags (e.g., status flag set to 0 or 1).

Initially, erase block B 515 can be in an erased and available state (not illustrated). A memory manager component (e.g., memory manager component the same as or similar to memory manager components 140, 280, 380) can be triggered to begin a data compaction operation. As a wear leveling operation proceeds, erase block B 515 can be selected as the new location of compacted data because it has a lower wear level than erase block A 510. The memory manager component can, for example, analyze the data in erase block A 510 to determine, for example, data validity. Data validity can be related to, for example, data still being related to a valid file, among others. Data validity can be indicated by a status flag stored with the data, can be tabulated in a separate table, can be determined by direct analysis, or combinations thereof, among other techniques or components that can be employed. For example, valid data can be indicated by a status flag set to 1 and invalid data can be indicated by a status flag set to 0.

Erase block A 510 can contain valid data and invalid data, which can be indicated by status flags or by other desired indication. For example, in erase block A 510, DATA 01 can be considered valid based in part on the associated status flag set to 1 and DATA 06 can be considered invalid based in part on the associated status flag being set to 0. Invalid data can consume memory space and is generally considered undesirable. Therefore, the memory manager component (e.g., the same as or similar to memory manager component 140 as illustrated in FIG. 1 and described herein) can be instructed to relocate only valid data to a different memory location.

Relocating data, for example, as part of data compaction, can be based in part on a predetermined relocation criteria (e.g., a selectable trigger) as herein discussed. For example, where erase block A 510 had reached, for example, 40% free space and 20% invalid data, a data compaction memory operation can be commenced. For example, DATA 01 can be relocated from PBA location PA100 in erase block A 510 to PBA location PA101 in erase block B 515. Similarly, DATA 02 can be relocated to PA201 in erase block B 515. DATA 06 can be determined to be invalid (e.g., status flag set to 0) and not be relocated. DATA 14 can be relocated from PA400 in erase block A 510 to PA401 in erase block B 515. DATA 25 can be determined to be invalid (e.g., status flag set to 0) and not be relocated. This process can continue for all pages 520 within erase block A 510. The data relocated to erase block B 515 can be valid data that was originally in erase block A 510 and such data can be in a more compact form than when such data was stored in erase block A 510.

As can be seen, only valid data is transferred to erase block B 515 and thus the number of consumed pages in erase block B 515 can be less than that of erase block A 510. Relocated data can be a more compact form of valid data even where data is not relocated in a contiguous manner (e.g., relocated data does not have to be relocated to the same erase block, relocated data does not have to be relocated into neighboring pages within the new erase block(s)). Thus, in this example, the data from erase block A 510 has been compacted and erase block B 515 now can contain the valid data from erase block A 510, allowing erase block A 510 to be erased and made available for new data storage.

As part of data compaction, where LBA translation is employed, an LBA lookup table or the like can be updated with new PBAs relating to the data referenced by LBAs. For example, relocated DATA 01 has a LBA of LA500 which maps to the PBA of PA101 in erase block B 515 after the LBA table is updated to reflect the data compaction (e.g., the old PBA of PA100 is updated to PA101). Where direct PBA addressing is employed, a PBA table or the like can be updated with new PBA locations of data related to a data compaction operation.

It will be appreciated by one of skill in the art that other forms of data compaction can be facilitated by employing a memory manager component (e.g., same as similar to memory manager components 140, 280, and 380), and these are considered within the scope of the disclosed subject matter. Further, additional functionality executed on a memory manager component (e.g., same as or similar to memory manager components 140, 280, and 380), such as relocating entire erase blocks (e.g., both valid and invalid data) for wear leveling without data compaction; relocating valid data to other erase blocks with more wear for data compaction without wear leveling; relocating data within the same erase block (e.g., where a page 520 throws an ECC error code, the data at that page and/or neighboring pages, can be relocated to other pages within the same erase block); relocating data to other erase blocks without erasing a first erase block (e.g., duplication of data), or combinations thereof, among others, are to be considered within the scope of the subject innovation.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 6-9 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states by way of state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, can encompass a computer program accessible from any computer-readable device, carrier, or media.

Figure 6:
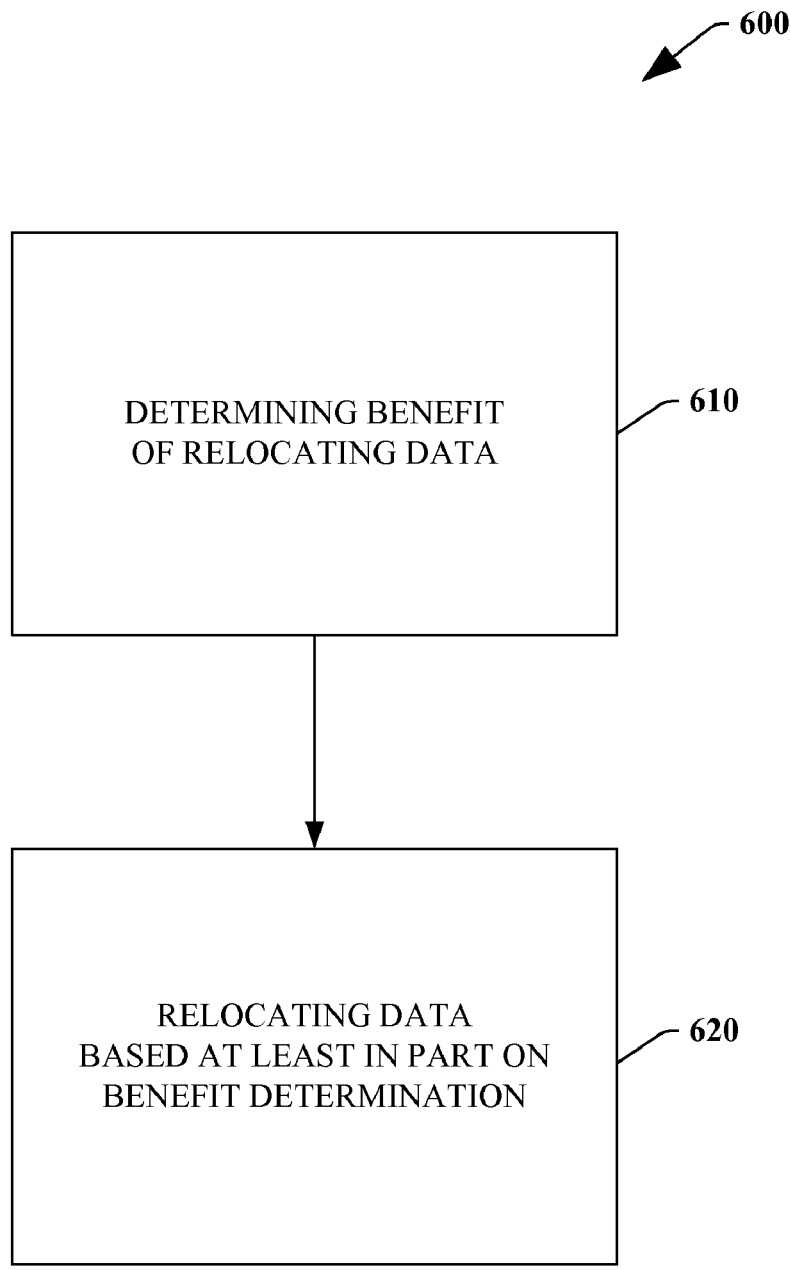
FIG. 6 illustrates a methodology that can facilitate a data relocation operation in accordance with an aspect of the disclosed subject matter.

Turning to FIG. 6, depicted is a methodology 600 that facilitates a relocating data associated with a memory in accordance with an aspect of the disclosed subject matter. At 610, a determination can be made relating to the benefit of relocating data. The benefit determination can be based in part on a predetermined relocation criteria that can relate to, for example, data compaction data, error code correction data, wear level data, inferences relating to data relocation, or combinations thereof, among others. For example, it can be determined on a processor (e.g., a memory manager component 140) local to a memory device that it is sufficiently beneficial to relocate data from a first erase block to a second erase block, for example, where the first erase block contains at least a predetermined threshold level of invalid data. As a second example, it can be determined that it is sufficiently beneficial to relocate, for example, a first page of data and a predetermined number of neighboring pages of data based in part on, for example, a determination and/or an inference (e.g., probabilistic inference, rules-based inference) that when the first page throws an ECC error code it is sufficiently probable that the predetermined number of neighboring pages are likely to be subject to damage or data corruption.

At 620, data can be relocated based in part on the benefit determination. The local processor component (e.g., memory manager component 140) can be employed to execute operations resulting in the relocation of data while consuming little or no processing resources from a first processor component (e.g., the memory controller component 130). For example, where it is determined that it is beneficial to relocate data because an erase block has reached a particular state (e.g., which can be at or above a predetermined threshold level for relocation), the process of relocating data can be conducted with, for example, the memory manager component 140 independent of, for example, the memory controller component 130. At this point the methodology 600 can end.

Where the methodology 600 is executed on a system similar to system 100 having, for example, a first processor (e.g., a memory controller component 130) and a second processor (e.g., a memory manager component 140), the second processor can be at least in part dedicated to processing higher level memory operations including data relocation operations, among others. The memory manager component 140 can be local to the memory component (e.g., memory component 110) such that execution of higher level operations (e.g., data relocation functions including data compaction, error code correction, and/or wear leveling, among others) can occur with little or no consumption of the processing resources of the memory controller component 130. For example, a memory manager component (e.g., 380) can be formed on the second substrate (e.g., 325) and can execute, for example, a wear leveling with data compaction operation (e.g., a static or active wear leveling operation to relocate data from more worn memory locations to less worn memory locations and compacting valid data) by, for example, reading data from more worn memory locations in core (e.g., 340), caching data to be moved in another core (e.g., 390), determining the validity of the cached data, determining a less worn location to relocate valid data to, and relocating the data to said less worn location in a more compact form, without requiring processing resources from memory controller component (e.g., 370).

Where methodology 600 is practiced on a uni-bus architecture, the memory controller component 130 and the memory manager component 140 can be communicatively coupled to facilitate sharing of the bus for conducting their respective operations. Where a multi-bus architecture is present, the memory controller component 130 and the memory manager component 140 can each operate on separate a separate bus and/or can be communicatively coupled to facilitate sharing the multiple bus lines based in part on, for example, bandwidth requirements of each processor, among others.

Further, where the methodology 600 is practiced in a system (e.g., system 100) wherein the plurality of processors divide memory and data relocation operations (e.g., low and high level operations), among others, in a different scheme (e.g., where the second processor contributes processing resources when the first processor desires additional processing resources to efficiently execute operations) it will be appreciated by one of skill in the art that this scheme is within the scope of the disclosed subject matter. For example, where memory controller component 130 executes all memory operations and data relocation operations (e.g., both low and high level operations), the memory manager component 140 can be employed to facilitate more optimized data relocation operations by, for example, processing the validity of data and caching the data so that the memory controller component 130 can execute the data relocation with lower resource requirements (e.g., the pool of resources formed by the first and second processor can be divided in an optimal manner to accomplish data relocation operations).

Figure 7:
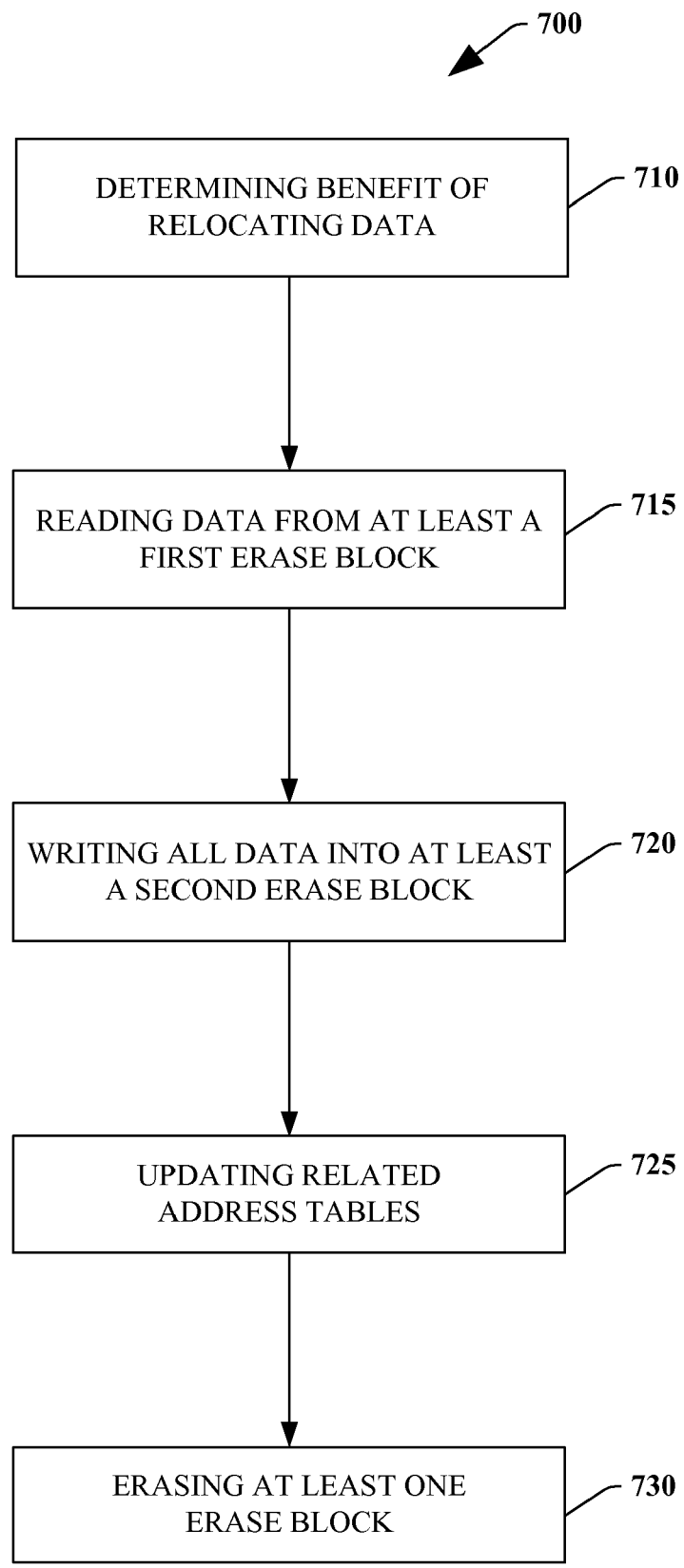
FIG. 7 illustrates a methodology that can facilitate relocating data in accordance with an aspect of the disclosed subject matter.

Referring to FIG. 7, a methodology 700 that can facilitate relocating data in accordance with an aspect of the disclosed subject matter. At 710, a determination relating to the benefit of relocating data can be made. The benefit determination can be based in part on predetermined relocation criteria that can be related to, for example, data compaction data, error code correction data, wear level data, inferences relating to data relocation, or combinations thereof, among others. For example, it can be determined by a processor local to a memory device (e.g., a memory manager component 140) that it is sufficiently beneficial to relocate data from first heavily worn erase block to a second lightly worn erase block to facilitate wear leveling.

At 715, data can be read from a first erase block to facilitate relocating data. The data to be relocated can be determined and read out by processes executing on a local processor (e.g., memory manager component 140). This read data can be further processed, for example, to determine if it is duplicative data, if any ECC codes were thrown when the data was read, or determining the feasibility of properly overwriting other invalid data locations with the read data, among many others. At 720, a subset of the read data (e.g., all valid data, or a desired subset thereof, read from the first erase block) can be written into at least a second erase block. Data can be written to at least a second erase block by executing instructions on the local processor (e.g., memory manager component 140). Data can be written to multiple erase blocks, for example, some read data can be written to a second erase block, and remaining read data can be written to a third and fourth erase block. This can be advantageous where a multitude of destination erase blocks have sufficient space to accommodate the written data without beginning the consumption of an additional free erase block.

At 725, related address tables can be updated with information relating to the relocated data. For example, where a logical block addressing is employed, the LBA conversion table (or the like) can be updated with the new PBAs of the relocated data. Similarly, where physical block addressing is employed, the PBA table (or the like) can be updated with the new PBAs of the relocated data. This action can also populate additional data such as cycle count data (e.g., wear level data), among others.

At 730, the first erase block can be erased to free the erase block for future use. Where data has been relocated to at least a second erase block, the data remaining in the first erase block can be duplicative and can unnecessarily consume valuable memory space. By erasing the first erase block, this memory space can be made available for future memory operations, for example, storing additional data. At this point, methodology 700 can end.

Figure 8:
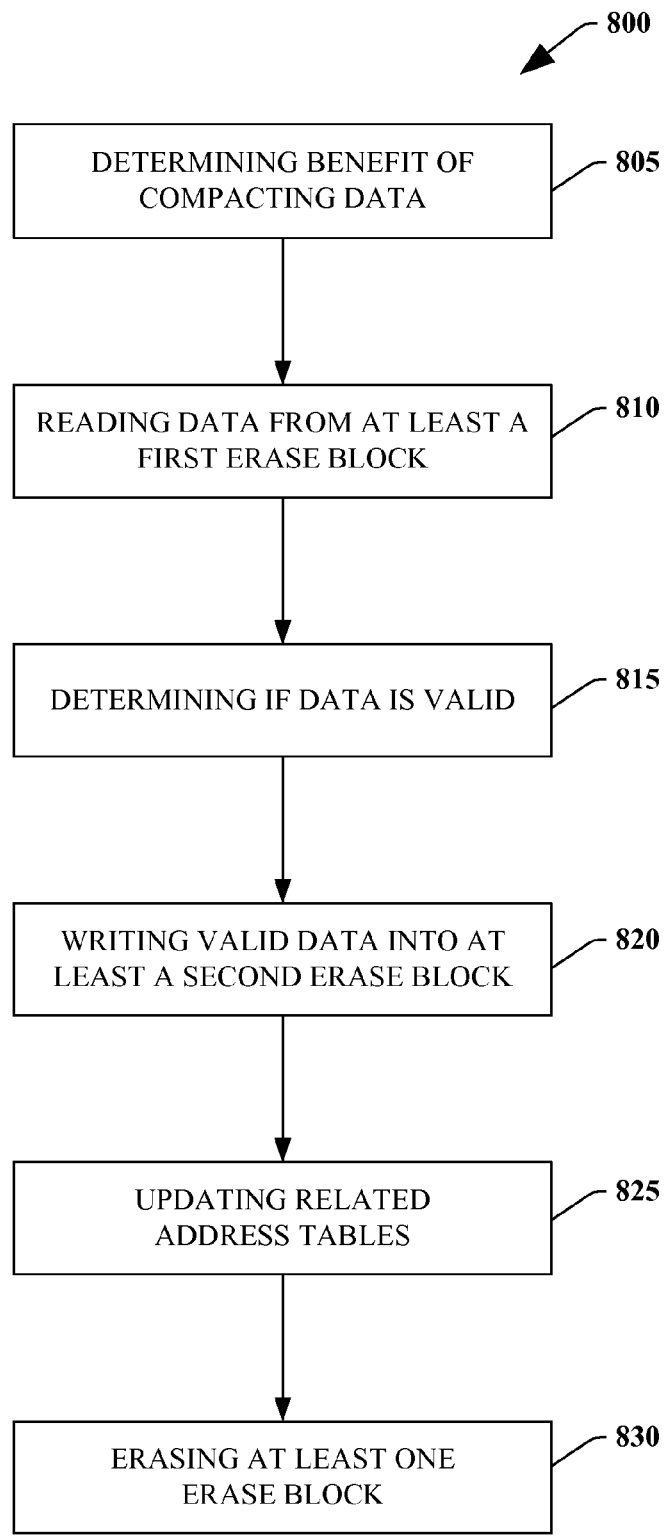
FIG. 8 illustrates a methodology that can facilitate relocating data in accordance with an aspect of the disclosed subject matter.

FIG. 8 depicts a methodology 800 that can facilitate relocating data in accordance with an aspect of the disclosed subject matter. At 805, a determination can be made relating to the benefit of compacting data. The benefit determination can be based in part on a predetermined relocation criteria that can be related to, for example, data compaction data, error code correction data, wear level data, inferences relating to data relocation, or combinations thereof, among others. For example, it can be determined by a processor (e.g., a memory manager component 140) local to a memory device that it is sufficiently beneficial to compact data from first erase block to at least a second erase block to make more memory available for use where the first erase block has a sufficiently high level of invalid data stored therein.

At 810, data can be read from a first erase block to facilitate relocating data. The data to be relocated can be determined and read out by processes executing on a local memory manager component 140. This read data can be further processed, for example, to determine if it is duplicative data, if any ECC codes were thrown when the data was read, or determining the feasibility of properly overwriting other invalid data locations with the read data, among many others. At 815, the read data can be analyzed to determine if it is valid data based in part on predetermined relocation criteria, for example, where data is part of a file that has been "deleted" a flag can have been set to indicate that the data is no longer valid. It is generally desirable to preserve valid data and to erase or overwrite invalid data. At 820, valid data can be written to at least a second erase block. Where valid data is written into at least a second erase block this can result in a more compact form of the valid data as discussed herein. This more compact form of the data can consume less memory space than the mix of valid and invalid data present in the first erase page. Data can be written to at least a second erase block by executing instructions on the local processor (e.g., memory manager component 140). Valid data can be written to multiple erase blocks, for example, some valid data can be written to a second erase block, and remaining valid data can be written to a third and fourth erase block. This can be advantageous where a multitude of destination erase blocks have sufficient space to accommodate the written valid data without beginning the consumption of an additional free erase block, and/or data can be written to multiple erase block to stripe the data to facilitate wear leveling of the data.

At 825, related address tables can be updated with information relating to the relocated data. For example, where a logical block addressing is employed, the LBA conversion table (or the like) can be updated with the new PBAs of the relocated data. Similarly, where physical block addressing is employed, the PBA table (or the like) can be updated with the new PBAs of the relocated data. This action can also populate additional data such as cycle count data (e.g., wear level data), among others.

At 830, the first erase block can be erased to free the erase block for future use. Where valid data has been relocated to at least a second erase block, the valid data remaining in the first erase block can be duplicative and can unnecessarily consume valuable memory space. Further, the invalid data in the first erase block also unnecessarily consumes valuable memory space. By erasing the first erase block, this memory space (e.g., the memory space consumed by the duplicative valid data and the invalid data) can be made available for future memory operations, for example, storing additional data. At this point, methodology 800 can end.

Figure 9:
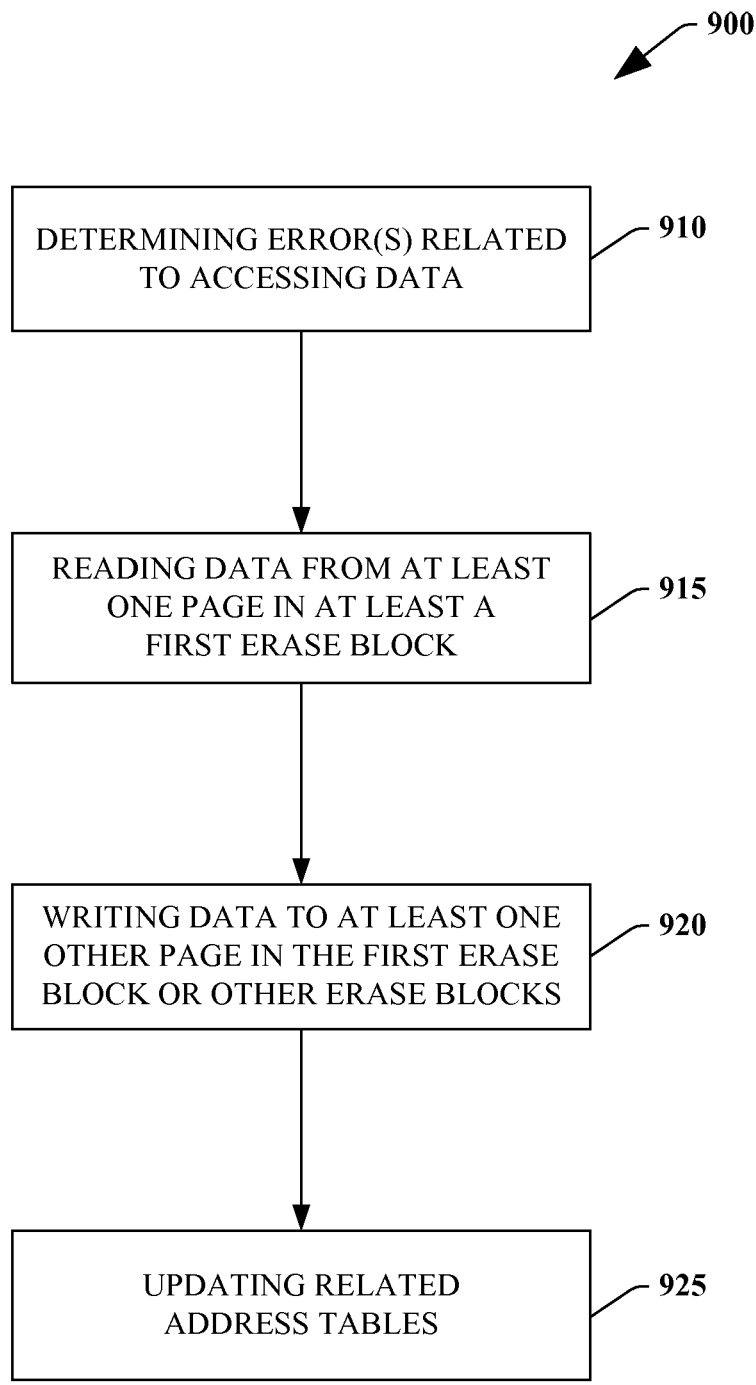
FIG. 9 illustrates another methodology that can facilitate relocating data in accordance with an aspect of the disclosed subject matter.

FIG. 9 depicts a methodology 900 that can facilitate relocating data in accordance with an aspect of the disclosed subject matter. At 910, a determination can be made relating to the benefit of relocating data based in part on errors related to accessing the data. These errors can be, for example, thrown ECC errors, among others. For example, it can be determined by a processor (e.g., a memory manager component 140) local to a memory device that it is sufficiently beneficial to relocate data within an erase block to facilitate preserving the data where the data is presently stored in a memory location that can be in a damaged state. Similarly, as a second example, it can be determined that it is sufficiently beneficial to relocate data between additional erase blocks to facilitate preserving data near a failing memory location (e.g., relocating data neighboring a failing memory location).

At 915, data can be read from at least a first page in an erase block to facilitate relocating data. The data to be relocated can be determined and read out by processes executing on a local processor (e.g., memory manager component 140). This read data can be further processed, for example, to determine if it is duplicative data, if any ECC codes were thrown when the data was read, or determining the feasibility of properly overwriting other invalid data locations with the read data, among many others. At 920, the read data can be written into at least a second page within the first erase block or some other erase block. Data can be written to at least a second page within a first erase block or other erase block by executing instructions on the local processor (e.g., memory manager component 140). Data can be written to pages in multiple erase blocks, for example, some read data can be written to a page in a second erase block, and remaining read data can be written to pages in a third and fourth erase block. This can be advantageous where a multitude of destination pages in other erase blocks have sufficient space to accommodate the written data without beginning the consumption of an additional free erase block, and/or data can be written to multiple erase block to stripe the data to facilitate wear leveling of the data.

At 925, related address tables can be updated with information relating to the relocated data. For example, where a logical block addressing is employed, the LBA conversion table (or the like) can be updated with the new PBAs of the relocated data. Similarly, where physical block addressing is employed, the PBA table (or the like) can be updated with the new PBAs of the relocated data. This action can also populate additional data such as cycle count data (e.g., wear level data), among others. Because this methodology 900 generally relocates pages of data in an erase block rather than all data in an erase block (although it is possible to relocate all data in an erase block by employing methodology 900), the methodology 900 generally does not erase the first erase block. However, where all data has been relocated to other erase blocks, the first erase block can be erased to free the space for future use. At this point, methodology 900 can end. Where defective memory locations have been identified, these can be marked to prevent future use (e.g., as part of bad block management, among others).

Figure 10:
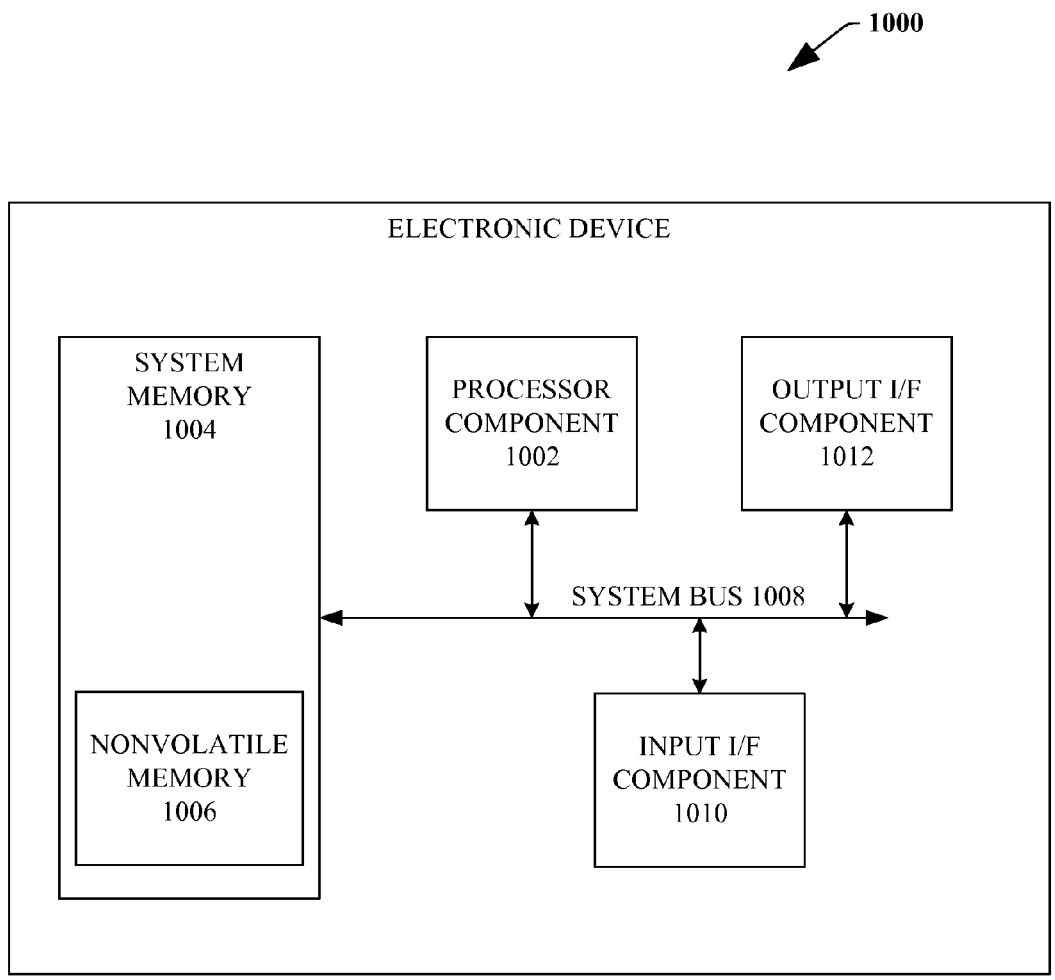
FIG. 10 illustrates a block diagram of an exemplary electronic device that can utilize a memory device(s) in accordance with an aspect of the disclosed subject matter.

Referring to FIG. 10, illustrated is a block diagram of an exemplary, non-limiting electronic device 1000 that can utilize a memory device (e.g., memory component 110, . . . ) in accordance with one aspect of the disclosed subject matter. The electronic device 1000 can include, but is not limited to, a computer, a laptop computer, network equipment (e.g. routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system or device (e.g., global position satellite (GPS) system), secure memory devices with computational capabilities, devices with a tamper-resistant chip(s), an electronic device associated with an industrial control system, an embedded computer in a machine (e.g., an airplane, a copier, a motor vehicle, a microwave oven), and the like.

Components of the electronic device 1000 can include, but are not limited to, a processor component 1002, a system memory 1004 (with nonvolatile memory 1006), and a system bus 1008 that can couple various system components including the system memory 1004 to the processor component 1002. The system bus 1008 can be any of various types of bus structures including a memory bus or memory controller, a peripheral bus, or a local bus using any of a variety of bus architectures.

Electronic device 1000 can typically include a variety of computer readable media. Computer readable media can be any available media that can be accessed by the electronic device 1000. By way of example, and not limitation, computer readable media can comprise computer storage media and communication media. Computer storage media can include volatile, non-volatile, removable, and non-removable media that can be implemented in any method or technology for storage of information, such as computer readable instructions, data structures, program modules or other data. Computer storage media includes, but is not limited to, RAM, ROM, EEPROM, nonvolatile memory 1006 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1000. Communication media typically can embody computer readable instructions, data structures, program modules or other data in a modulated data signal such as a carrier wave or other transport mechanism and includes any information delivery media.

The system memory 1004 can include computer storage media in the form of volatile and/or nonvolatile memory 1006 (e.g., memory component 110 and the like). A basic input/output system (BIOS), containing the basic routines that help to transfer information between elements within electronic device 1000, such as during start-up, can be stored in memory 1004. Memory 1004 can typically contain data and/or program modules that can be immediately accessible to and/or presently be operated on by processor component 1002. By way of example, and not limitation, system memory 1004 can also include an operating system, application programs, other program modules, and program data.

The nonvolatile memory 1006 can be removable or non-removable. For example, the nonvolatile memory 1006 can be in the form of a removable memory card or a USB flash drive. In accordance with one aspect, the nonvolatile memory 1006 can include flash memory (e.g., single-bit flash memory, multi-bit flash memory), ROM, PROM, EPROM, EEPROM, and/or NVRAM (e.g., FeRAM), or a combination thereof, for example. Further, the flash memory can be comprised of NOR flash memory and/or NAND flash memory.

A user can enter commands and information into the electronic device 1000 through input devices (not illustrated) such as a keypad, microphone, tablet or touch screen although other input devices can also be utilized. These and other input devices can be connected to the processor component 1002 through input interface component 1010 that can be connected to the system bus 1008. Other interface and bus structures, such as a parallel port, game port or a universal serial bus (USB) can also be utilized. A graphics subsystem (not illustrated) can also be connected to the system bus 1008. A display device (not illustrated) can be also connected to the system bus 1008 via an interface, such as output interface component 1012, which can in turn communicate with video memory. In addition to a display, the electronic device 1000 can also include other peripheral output devices such as speakers (not illustrated), which can be connected through output interface component 1012.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Artificial intelligence based systems (e.g., explicitly and/or implicitly trained classifiers) can be employed in connection with performing inference and/or probabilistic determinations and/or statistical-based determinations as in accordance with one or more aspects of the disclosed subject matter as described herein. As used herein, the term "inference," "infer" or variations in form thereof refers generally to the process of reasoning about or inferring states of the system, environment, and/or user from a set of observations as captured by way of events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

For example, an artificial intelligence based system can evaluate current or historical evidence associated with relocating data (e.g., efficiency of compactions related to trigger points, historical use of memory (e.g., time of use, length of use, intensity of use, frequency of use, . . . ), error patterns correlated with bad pages read and/or written, . . . ) and based in part in such evaluation, can render an inference, based in part on probability, regarding, for instance, relocating neighboring data, selecting a more optimized window for data compaction, adjusting an event trigger point to better optimize data access and/or data relocation operations, combinations thereof and others. One of skill in the art will appreciate that intelligent and/or inferential systems can facilitate further optimization of the disclosed subject matter and such inferences can be based on a large plurality of data and variables all of which are considered within the scope of the subject innovation.

For instance, one of skill in the art will appreciate that an intelligent component (not illustrated) can be and/or can be part of the intelligence based system and can be included in system 100, 200, and/or 300 to facilitate determining inferences related to accessing and/or relocating data associated with a memory. For example, an inference can be made, based at least in part on current and/or historic data access, that a user will not be accessing data between 1 A.M. and 7 A.M. and further it can be inferred that data compaction can occur most efficiently between those hours such that data compaction is delayed until that time window. As a second example, it can be inferred, based on historical device usage, that when a memory location fails, a predetermined number of neighboring memory locations also fail contemporaneously, and based on that inference, data in a failing memory location and the five neighboring memory locations can be relocated to reduce loss of data. One of skill in the art will appreciate that the number of inferences that can be made is nearly limitless and that all such inferences are to be considered within the scope of the disclosed subject matter.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
   at least one memory component configured to include a plurality of memory locations contained in a memory array, the plurality of memory locations comprising at least one memory location and at least one other memory location;
   a first processor component configured to perform at least one lower level memory operation on the at least one memory location, the at least one lower level memory operation comprising at least one of a read operation, a write operation, an erase operation, or a refresh operation; and
   a second processor component configured to be local to the at least one memory component and further configured to determine whether at least one higher level memory operation is to be performed on the at least one other memory location and, in response to determining the at least one higher level memory operation is to be performed, perform the at least one higher level memory operation on the at least one other memory location independent of the first processor component and without using any processing resources from the first processor component, the at least one higher level memory operation comprising at least one of data compaction, error code correction, or wear leveling, wherein the first processor component and the second processor component are further respectively configured to operate independent of each other for at least a portion of time including during respective performance of the at least one lower level memory operation and the at least one higher level memory operation, which are performed simultaneously, and wherein the second processor component is further configured to obtain code relating to the at least one higher level memory operation from a storage component and execute the code to facilitate performance of the at least one higher level memory operation.

2. The system of claim 1, wherein the at least one memory component further comprises at least one of a flash memory, mask-programmed read only memory, programmable read only memory, erasable programmable read only memory, ultra-violet-erase erasable programmable read only memory, one-time programmable read only memory, or electrically erasable programmable read only memory.

3. The system of claim 1, further comprising a uni-bus architecture wherein the first and second processor components, respectively, are further configured to utilize a shared bus to facilitate performance of the at least one lower level memory operation and the at least one higher level memory operation.

4. The system of claim 1, further comprising a multi-bus architecture wherein the first processor component is further configured to be connected to and utilize a first bus, which is connected to the at least one memory component, to perform the at least one lower level memory operation, and the second processor component is further configured to be connected to and utilize a second bus, which is connected to the at least one memory component, to perform the at least one higher level memory operation to facilitate simultaneous performance of the at least one lower level memory operation and the at least one higher level memory operation.

5. The system of claim 1, further comprising a single substrate that includes at least the first and second processor components.

6. The system of claim 5, further comprising at least one other processor component included on the single substrate.

7. The system of claim 1, further comprising a plurality of substrates wherein the first processor component is included in a different substrate than a substrate that contains the second processor component.

8. The system of claim 7, wherein the at least one higher level operation is a data compaction operation, wherein the second processor component is further configured to relocate valid data from the at least one other memory location to one or more specified memory locations in the memory array and discard invalid data that was stored in the at least one other memory location, when the amount of invalid data stored in the at least one other memory location is at least at a predefined threshold amount of invalid data.

9. The system of claim 1, wherein the first processor component is further configured to simultaneously utilize a first bus to execute instructions and a second bus to transfer data to or from the at least one memory location in relation to performance of the at least one lower level memory operation, and the second processor component is further configured to utilize a third bus to perform the at least one higher level memory operation.

10. The system of claim 1, wherein at least one of the first processor component or the second processor component is further be configured to generate at least one inference that at least in part facilitates at least one determination related to relocation of data as at least part of data compaction, error code correction, static wear leveling, or active wear leveling.

11. The system of claim 1, wherein the at least one memory component is associated with at least one of a smart card, a computer, a laptop computer, network equipment, a media player, a media recorder, a television, a phone, a cellular phone, a smart phone, an electronic organizer, a personal digital assistant, a portable email reader, a digital camera, an electronic game, an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system, a secure memory device with computational capabilities, a device with at least one tamper-resistant chip, an electronic device associated with industrial control systems, or an embedded computer in a machine, wherein the machine comprises one of an airplane, a copier, a motor vehicle, or a microwave oven.

\* \* \* \* \*